US00RE37084E

(19) United States
(12) Reissued Patent
Ito et al.

(10) Patent Number: US RE37,084 E
(45) Date of Reissued Patent: Mar. 6, 2001

(54) OBJECTIVE LENS DRIVING APPARATUS FOR OPTICAL DISC PLAYER

(75) Inventors: Masashi Ito, Settsu; Hiroshi Yasuda, Hirakata; Hiroyuki Nakamura, Kobe; Toshiki Itoi, Nara, all of (JP)

(73) Assignee: Matsushita Electric Industrial Co., Ltd., Osaka (JP)

(21) Appl. No.: 09/120,799

(22) PCT Filed: May 29, 1984

(86) PCT No.: PCT/JP84/00275

§ 371 Date: Jan. 29, 1985

§ 102(e) Date: Jan. 29, 1985

(87) PCT Pub. No.: WO84/04841

PCT Pub. Date: Dec. 6, 1984

Related U.S. Patent Documents

Reissue of:
(64) Patent No.: 4,646,283
Issued: Feb. 24, 1987
Appl. No.: 06/700,818
Filed: Jan. 29, 1985

(30) Foreign Application Priority Data

| | | |
|---|---|---|
| May 31, 1983 | (JP) | 58-97111 |
| May 31, 1983 | (JP) | 58-97112 |
| May 31, 1983 | (JP) | 58-97121 |
| Jun. 28, 1983 | (JP) | 58-117601 |

(51) Int. Cl.[7] ..... G11B 7/08; G02B 7/02

(52) U.S. Cl. ..... 369/256; 369/44.15; 369/44.22; 369/247; 359/824; 359/814

(58) Field of Search ..... 369/244, 247, 369/248, 44.14, 44.15, 44.16, 44.21, 44.22; 359/814, 823, 824

(56) References Cited

U.S. PATENT DOCUMENTS

| | | | | |
|---|---|---|---|---|
| 4,092,529 | | 5/1978 | Aihara et al. | 250/201.5 |
| 4,449,213 | * | 5/1984 | Noborimoto et al. | 369/44.16 |
| 4,467,463 | * | 8/1984 | Yano | 369/44.21 |

(List continued on next page.)

FOREIGN PATENT DOCUMENTS

| | | | |
|---|---|---|---|
| 92997 | * | 11/1983 | (EP) . |
| 0092842 | | 11/1983 | (EP) . |
| 2090038 | | 6/1982 | (GB) . |

(List continued on next page.)

OTHER PUBLICATIONS

Patent Abstracts of Japan, vol. 6, No. 225 (P–154) [1103], Nov. 10, 1982; & JP–A–57 127934 (Hitachi Seisakusho K.K.) Aug. 9, 1982.
Patent Abstracts of Japan, vol. 6, No. 108 (P–123) [986], Jun. 18, 1982; & JP–A–57 37752 (Matsushita Denki Sangyo K.K.) Mar. 2, 1982.
Patent Abstracts of Japan; vol. 7, No. 266(P–239) [1411], Nov. 26, 1983; & JP–A 58–146035 (Fuosutaa Denki K.K.) Aug. 31, 1983.
Patent Abstracts of Japan; vol. 8, No. 101 (P–273) [1538], May 12, 1984; ( JP–A–59 11 544 (Nihon Kougaku Kogyo K.K.) Jan. 21, 1984.

*Primary Examiner*—David L. Ometz
(74) *Attorney, Agent, or Firm*—Stevens, Davis, Miller & Mosher, L.L.P.

(57) ABSTRACT

Disclosed is an objective lens driving apparatus having a holder 9 holding an objective lens 1 and connected to a base 17 through at least four linear members 13, such that the holder 9 can be moved both in the focussing direction and in the tracking direction orthogonal to the focussing direction through the flexing of the linear members 13. Undesirable local resonance can be suppressed due to the use of the linear members 13 in support of the holder 9.

26 Claims, 5 Drawing Sheets

AMENDED

U.S. PATENT DOCUMENTS

| | | | | |
|---|---|---|---|---|
| 4,475,179 | * | 10/1984 | Geyer | 369/44.13 |
| 4,495,611 | * | 1/1985 | Suzuki | 369/170 |
| 4,504,935 | * | 3/1985 | Jansen | 369/32 |
| 4,511,212 | * | 4/1985 | Tanaka | 369/112 |
| 4,547,871 | * | 10/1985 | Sugiyama et al. | 369/44.16 |
| 4,553,227 | * | 11/1985 | Kido et al. | 369/44.16 |
| 4,568,142 | * | 2/1986 | Iguma | 369/44.16 |
| 4,592,037 | * | 5/1986 | Ohnuki | 369/44.14 |

FOREIGN PATENT DOCUMENTS

| | | | | |
|---|---|---|---|---|
| 2091902 | | 8/1982 | (GB) . | |
| 51-363 | | 1/1976 | (JP) . | |
| 56-25332 | | 7/1981 | (JP) . | |
| 56-130840 | * | 10/1981 | (JP) | 369/44.15 |
| 57-018037 | | 1/1982 | (JP) . | |
| 57-164836 | | 4/1982 | (JP) . | |
| 57-189141 | | 5/1982 | (JP) . | |
| 57-127934 | | 8/1982 | (JP) . | |
| 57-183640 | | 11/1982 | (JP) . | |
| 58-64648 | | 4/1983 | (JP) . | |
| 8400243 | | 1/1984 | (WO) . | |

* cited by examiner

AMENDED

AMENDED

AMENDED
Fig.7
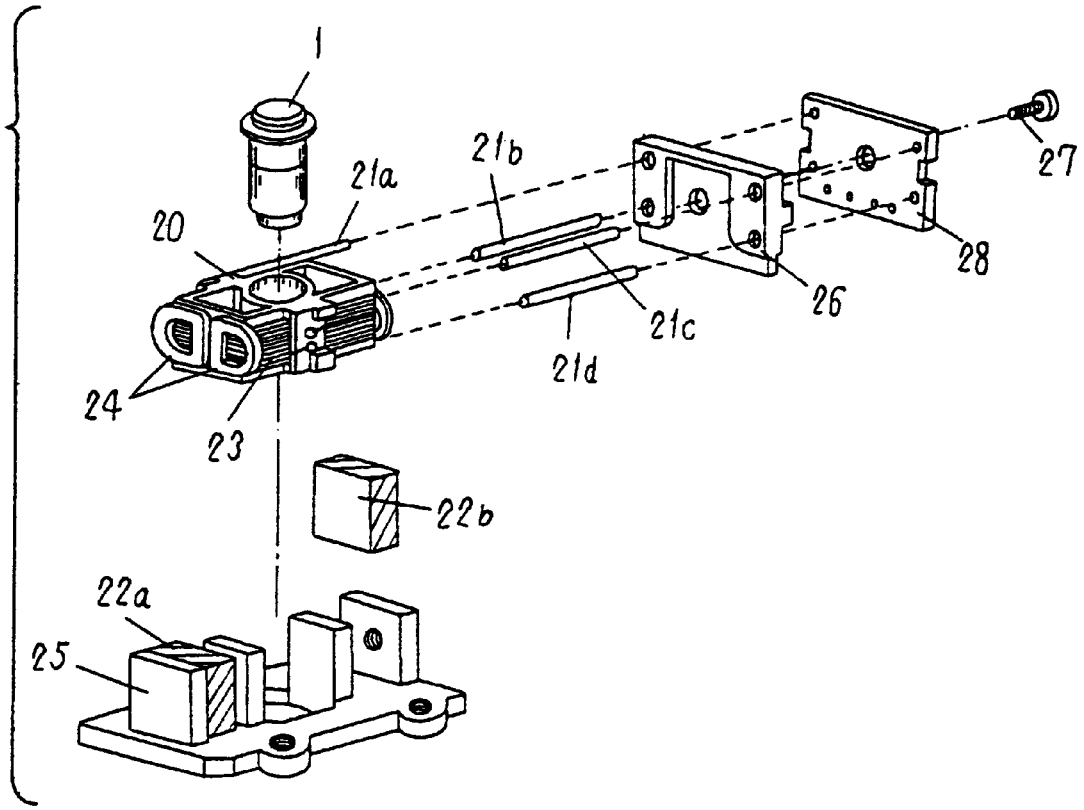

OBJECTIVE LENS DRIVING APPARATUS FOR OPTICAL DISC PLAYER

Matter enclosed in heavy brackets [ ] appears in the original patent but forms no part of this reissue specification; matter printed in italics indicates the additions made by reissue.

FIELD OF THE INVENTION

The present invention relates to an objective lens driving apparatus for use in an optical disc player which is adapted to optically read information from a disc-shaped recording medium by projecting a light spot onto the medium.

BACKGROUND ART

Known disc players of the kind described incorporate an optical pickup adapted to be moved linearly in the radial direction of a disc. A pickup is provided with an objective lens which is driven both in the focussing direction and tracking direction thus optically reading an information recorded in the disc. In order to attain a highly precise reading of the information in this type of optical disc player, therefore, it is necessary to conduct both focussing control for controlling the distance between the objective lens and the information track by moving the objective lens such as to eliminate any change in the distance attributable to distortion and oscillation of the disc, and tracking control for moving the objective lens in a manner to follow up the information track. These two types of control necessitate an objective lens driving apparatus capable of driving the objective lens both in the focussing direction and the tracking direction.

A known objective lens driving apparatus, which has been improved to some extent, will be explained hereinunder. FIG. 1 is a perspective view of the known objective lens driving apparatus, while FIG. 2 is an exploded perspective view of the same. An objective lens designated by reference numeral 1 is held by a holder 2. The objective lens 1 is movably supported by web-like supporting members 4 which are made of a plastic material and fixed both to the holder 2 and a base 3 of the objective lens driving apparatus. U-shaped yokes 5a, 5b made of a magnetic material are fixed to the base by means of small screws 6a to 6d. Permanent magnets 7a, 7b are secured to respective yokes 5a, 5b in a manner to provide magnetic gaps between these permanent magnets and the associated yokes. Coils 8a, 8b are wound around the holder 2.

This known objective lens driving apparatus operates in a manner which will be explained hereinunder.

The levels and polarities of electric currents supplied to the coils 8a, 8b are suitably controlled so that the holder 2 is electromagnetically driven by the electromagnetic forces exerted across the magnetic gaps formed between the permanent magnets 7a, 7b and the yokes 5a, 5b thereby moving the objective lens 1 two-dimensionally within a plane as indicated by arrows in FIG. 1. Consequently, the objective lens 1 is moved in two directions, i.e., in the focussing direction and in the tracking direction, thus allowing a high accuracy in the reading of the information.

In this known objective lens driving apparatus, the objective lens is supported by the web-like supporting members 4 which are adapted to be flexed to permit the movement of the objective lens 1 both in the focussing direction and the tracking direction. This arrangement is complicated and raises the cost of production considerably and is liable to allow local partial resonance which impedes the operation of the apparatus tremendously. Namely, when the supporting members 4 are flexed in the focussing direction, stress is produced not only in the focussing direction but also in the tracking direction and an undesirable local resonance is caused by the stress acting in the tracking direction.

In this known objective lens driving apparatus, it is necessary that clearances between the holder 2 and the assemblies of the yokes 5a, 5b and permanent magnets 7a, 7b are controlled highly precisely. Furthermore, since the yokes 5a, 5b and the base 3 are formed as separate parts, there is a fear that the aforementioned gaps may be eliminated due to the sum of the dimensional errors of these parts. Therefore, it is required that these parts be finished within small tolerances, resulting in a raised cost of production of the parts.

The supporting members 4 in support of the objective lens are constructed such that the lens is held horizontally when no load is applied thereto. In the assembled state of the apparatus, therefore, the supporting members are deflected downwardly due to the weight of the lens and the holder, so that these supporting members tend to suffer from a torsional resonance. This problem can be solved by supplying the driving coils with biasing electric currents such as to raise the objective lens by the electromagnetic force produced by the biasing electric currents. This solution, however, causes other problems such as wasteful use of electric power and generation of heat.

DISCLOSURE OF THE INVENTION

Accordingly, an object of the invention is to provide an objective lens driving device for optical disc players which is improved to reduce undesirable local resonance thereby obviating the above-described problems of the prior art.

To this end, the invention provides in its one aspect an objective lens driving device having a holder to which an objective lens is fixed, a base, and at least four linear members arranged in parallel and fixed at their both ends to said holder and said base, respectively, whereby said holder is resiliently supported on said base through said linear members both in the focussing direction and tracking direction.

The invention provides in another aspect an objective lens driving apparatus for an optical disc player comprising: an objective lens; a holder holding the objective lens; a tracking driving coil and a focussing driving coil fixed to the holder; a base; magnets fixed to the base and disposed in a manner to face the driving coils; and a supporting means having one end fixed to the holder and the other end fixed to the base and supporting the holder movably with respect to the base; wherein the improvement comprises that the supporting means exerting a biasing force of a level corresponding to the weights of the objective lens and the holder such that the centers of the driving coils correctly face the centers of the magnets when no electric current is supplied to the driving coils.

In still another aspect of the invention, two or more magnetic yokes are integrated into a single member so that the troublesome position control work is eliminated and the number of the parts is decreased so as to remarkably reduce the production cost of the apparatus.

In a further aspect of the invention, the yokes and the base of the objective lens driving apparatus is integrated into one body so as to reduce the overall height of the objective lens driving apparatus.

BRIEF DESCRIPTION OF THE DRAWINGS

FIG. 7 is an exploded perspective view of another embodiment of the invention.

THE BEST MODE FOR CARRYING OUT THE INVENTION

Figure 1:
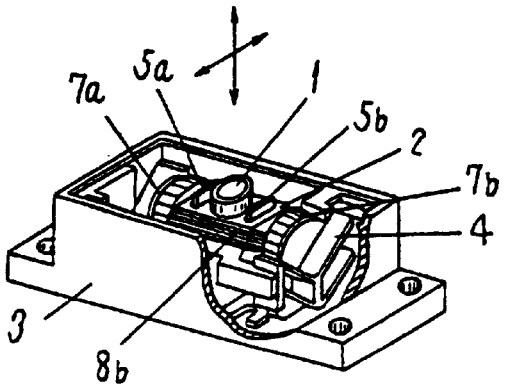
Fig. 1 PRIOR ART
FIGS. 1 and 2 are a fragmentary perspective view of an essential portion of a conventional objective lens driving apparatus and an exploded perspective view of the whole apparatus.
Figure 2:
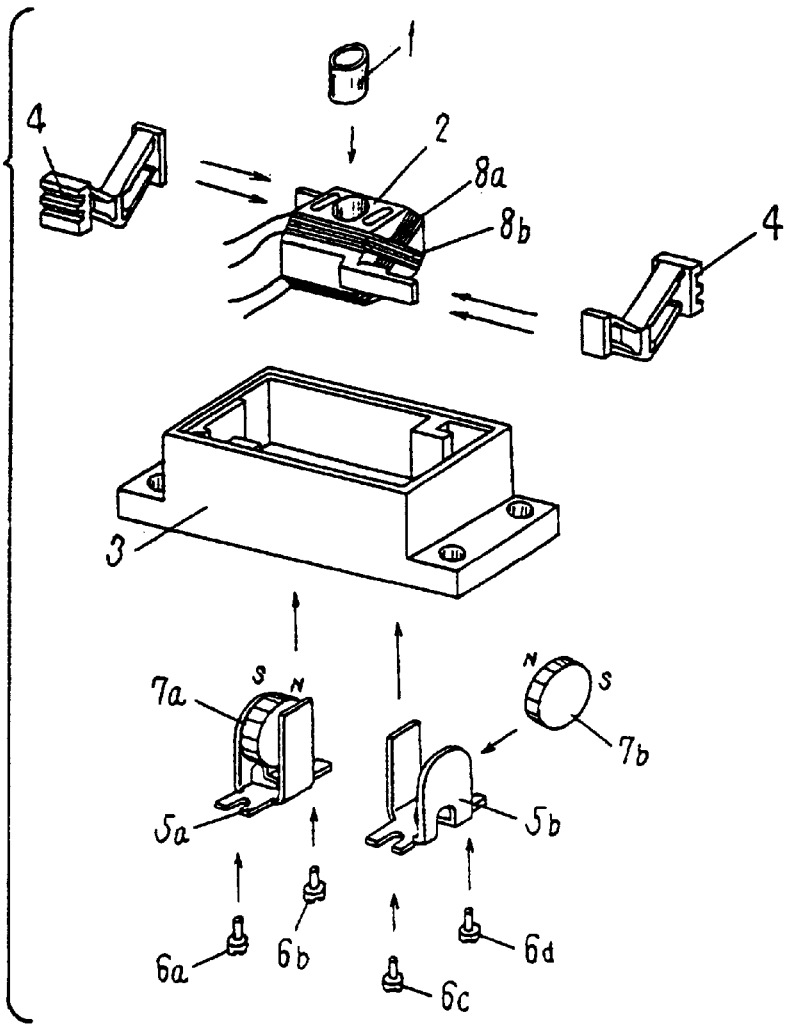
Fig. 2 PRIOR ART
Figure 3:
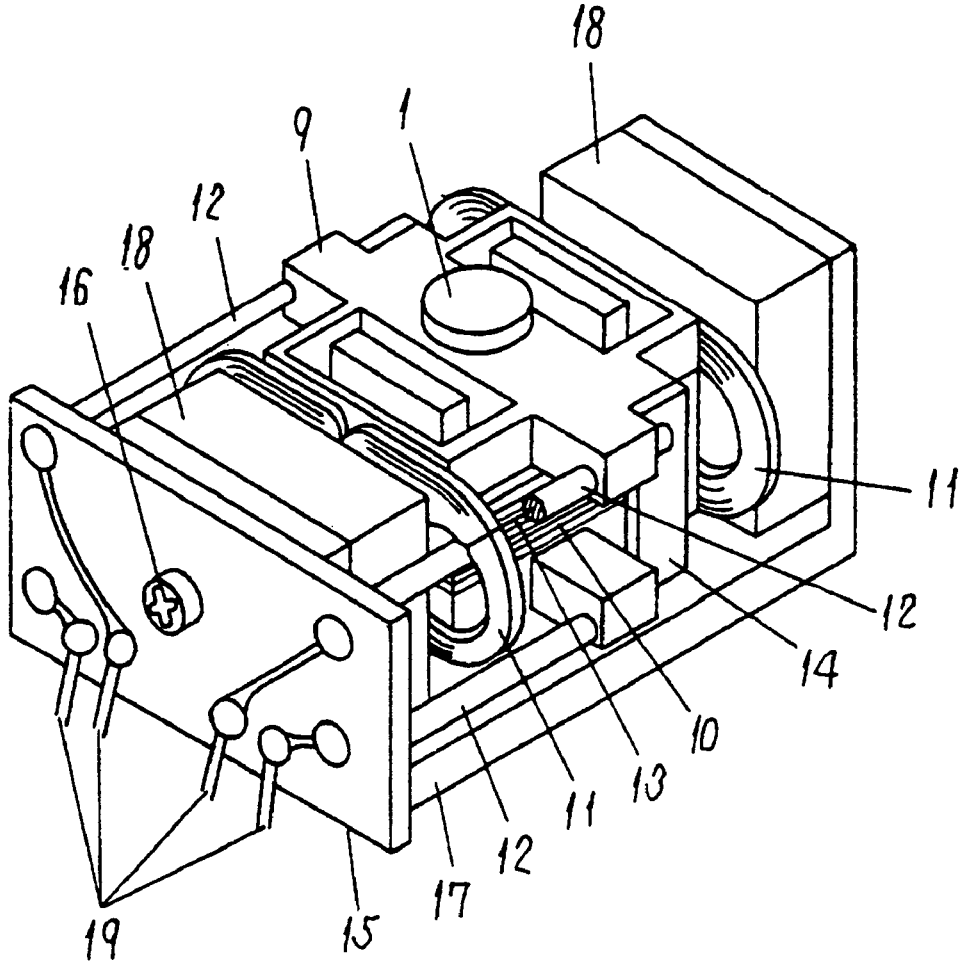
FIGS. 3 and 4 are a perspective view and an exploded perspective view of an embodiment of the invention.
Figure 4:
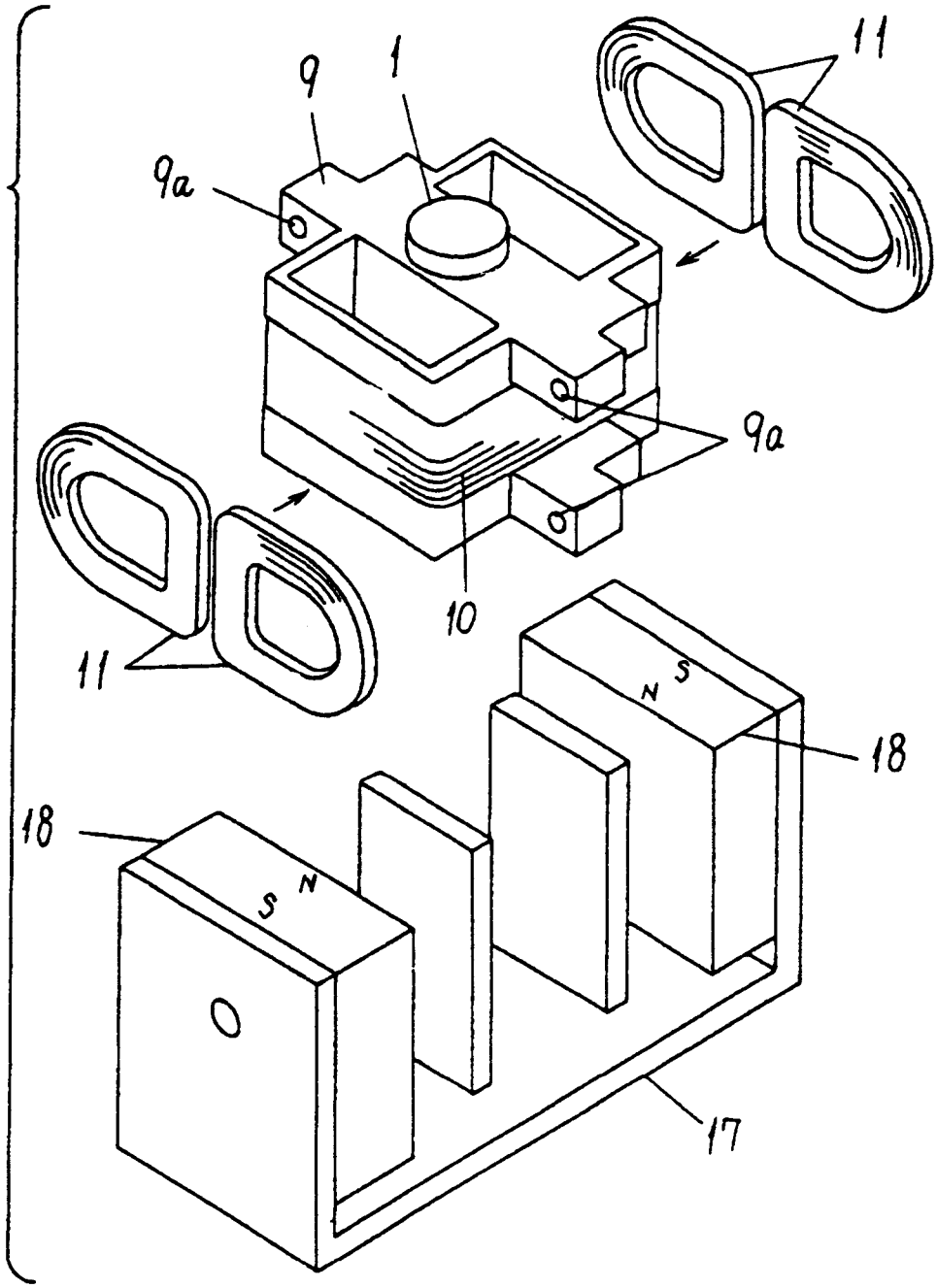

FIG. 3 shows an embodiment of the invention, while FIG. 4 illustrates the detail of the driving section of the embodiment shown in FIG. 3.

An objective lens 1 is bonded to a holder 9 around which is wound a focussing driving coil 10. A pair of D-shaped tracking driving coils 11 are bonded to both lateral sides of the holder 9. Each driving coil has a linear section constituting an effective driving portion and another section which does not contribute to the driving and hence has a semicircular form for reducing the electric resistance, thus presenting a D-shaped form as a whole.

Four lengths of metallic wire 13 covered by four lengths of rubber tube 12 have one of their ends fitting in holes 9a formed in the holder 9 and soldered to a printed circuit board 14 adhered to the holder 9, while the other ends are soldered to another printed circuit board 15 which in turn is fixed to a base 17 by means of a screw 16. The base 17 is made of a magnetic material and constitute a magnetic circuit in cooperation with two magnets 18 bonded thereto.

The focussing driving coil 10 and the tracking driving coils 11 are soldered at their both ends to the printed circuit board 14. The driving coils 10 and 11 are electrically connected to four lengths of metallic wire 13 through a copper foil on the printed circuit board 14.

Lead wires 19 are soldered to the printed circuit board 15 and electrically connected to the lengths of metallic wire 13.

In operation, electric currents are supplied to the focussing driving coil 10 or the tracking driving coils 11 through the lead wires 19 and the lengths of metallic wire 13, so that the holder 9 and hence the objective lens 1 are driven in the focussing direction or in the tracking direction through the interaction between the electric currents supplied to the coils and the magnetic fields produced by the magnets 18.

In the described embodiment of the invention, since the holder 9 is supported by the lengths of metallic wire 13 both in the focussing and tracking directions, the compliances in both directions are equalized to permit the driving of the objective lens in both directions by an equal level of the electric power.

Moreover, the metallic wire 13 is not in the form of a plate but is in the form of a line. So, when the lengths of metallic wire 13 supporting the holder 9 in the focussing direction are flexed in the same direction, unnecessary stresses produced in the lengths of metallic wire 13 which support the holder 9 in the tracking direction become considerably small as compared with the prior metallic wire made of a leaf spring. Therefore, detrimental local resonance is reduced.

Furthermore, the cantilever-type supporting structure for the holder 9 permits the use of metallic wire 13 having a comparatively large diameter as compared with the case where the holder 9 is supported at its both sides, for attaining an equal level of compliance. Consequently, the length of the metallic wire 13 can be increased to ensure highly stiff and reliable resilience of the supporting structure while allowing a large stroke of the displacement of the holder 9 in each direction. Conversely, when the diameter of the metallic wire 13 in the cantilever-type supporting structure is equal to that of the metallic wire which supports both sides of the holder 9, the efficiency can be increased due to large compliance.

Therefore, by selecting the optimum diameter of the metallic wire in the light of the compliance, it is possible to obtain a high efficiency and reliability of the resilient supporting structure. In addition, the inclination of the objective lens 1 is eliminated because the holder 9 is always held in parallel with the base 17 during its movement.

It is to be noted also that the inclination or tilt of the movable part can be adjusted easily because the movable parts as a whole is rotatable about the screw 16.

Although the described embodiment incorporates four lengths of metallic wire 13 in total, this number is not exclusive and the arrangement may be such that six lengths of metallic wire, i.e., three lengths for supporting the holder in one direction and three lengths for the other direction, are used for supporting the holder. In addition, instead of covering the metallic wire 13 by rubber tube 12, the metallic wire 13 and the covering rubber layer can be formed integrally by insertion molding. In the described embodiment, the printed circuit board 15 is directly fixed to the base by a single screw 16. This arrangement may be modified such that the printed circuit board 15 is secured to the base 17 by two or more screws with an intermediary of a rubber layer placed therebetween, so as to permit position control of the holder 9 not only in the focussing and tracking directions but also in the longitudinal direction.

Preferably, a very straight wire having a high tensile strength and resiliency are used as the metallic wire, such as, for example, phosphor bronze wire, beryllium copper wire, piano wire, stainless steel wire and so forth. The cross-section of the metallic wire may be circular or square. Namely, all that is required is that each metallic wire not have any directivity in two orthogonal directions. The diameter or size of the cross-section of the metallic wire should be selected suitably in view of Young's modulus. In normal cases, metallic wire of a diameter between 0.1 mm and 0.2 mm are used suitably. Needless to say, linear members made of a polymeric material may be used in place of the metallic wire.

Figure 5A:
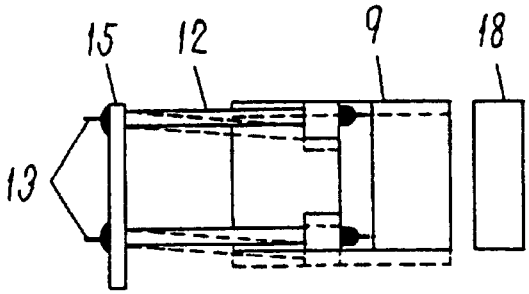
FIGS. 5a and 5b are illustrations of methods soldering metallic wires in the embodiment shown in FIGS. 3 and 4.

FIG. 5 illustrates how the lengths of metallic wire 13 are soldered.

Figure 5B:
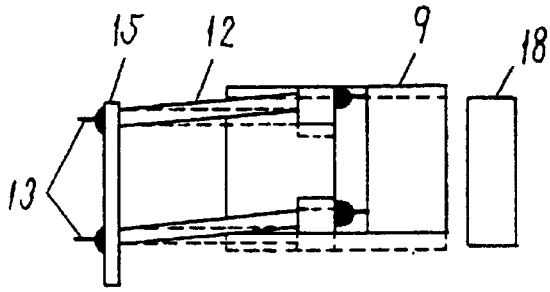

If the soldering is conducted with the holder 9 held in the horizontal position, the holder 9 is lowered as shown by broken lines in FIG. [6a] *5a* after such soldering, due to its weight. In such a case, the holder 9 cannot correctly face the magnets 18 so that undesirable torsional resonance tends to occur. To obviate this problem, in the manufacture of the described embodiment of the apparatus, such soldering is conducted while holding the holder 9 at a raised position as shown in FIG. 5b, such that, when the holder is lowered by the force of its weight and the weight of the objective lens after the soldering, the driving coils 10 and 11 can correctly face the magnets 18, thus eliminating the possibility of the torsional resonance.

Figure 6A:
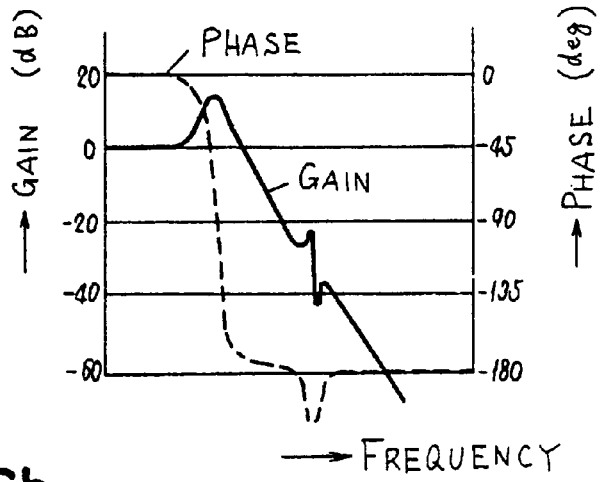
FIGS. 6a and 6b are gain characteristic charts corresponding to FIGS. 5a and 5b, respectively.
Figure 6B:
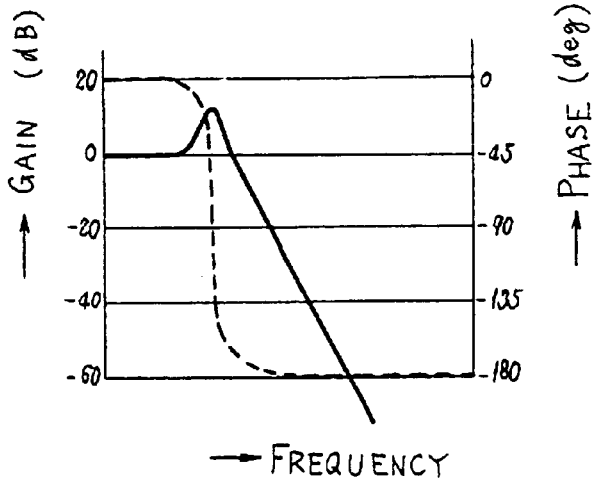

FIG. 6a illustrates the result of measurement of the movement of the objective lens 1 as observed in the conventional apparatus when the tracking driving coils 11 are supplied with electric currents, while FIG. 6b shows the result as observed in the apparatus of the invention. As will be seen from FIG. 6a, in the conventional apparatus, the gain characteristic involves a peak dip due to the torsional resonance, resulting in a delay of phase. In consequence, the transient characteristic is impaired at the resonance frequency. In contrast, the embodiment of the invention is almost free from the peak dip due to torsional resonance, as will be seen from FIG. 6b.

Although in the described embodiment the lengths of metallic wire constituting the resilient supporting members serve also as electric conductors through which electric current is supplied, the resilient supporting members may be merely mechanical supporting means without electric conductivity.

FIG. 7 is an exploded perspective view of another embodiment of the objective lens driving apparatus in accordance with the invention. In this Figure, reference numeral 1 designates an objective lens, 20 a holder holding the objective lens 21a to 21b lengths of metallic wire for supporting the holder, 22a and 22b magnets, 23 a focussing driving coil wound on the holder 20, 24 a tracking driving coil constituted by four D-shaped coils fixed to the holder 20, 25 an integral yoke-base assembly formed by, for example, sintering from a magnetic material, [25] *28* a wiring substrate, and 26 a holder for locating metallic wires 21a to 21b. The holder 26 is secured together with the substrate [25] *28* to the yoke-base assembly 25 by means of a small screw 27.

The holder 20 is supported by means of four lengths of metallic wire 21a, 21b, 21c and 21d, for free movement with respect to the disc-like recording medium both in the tracking and focussing directions without making any tilt. Two magnetic gaps are formed between two magnets 22a, 22b and the single yoke base 25. The objective lens 1 can be driven both in the focussing direction and the tracking direction as electric current is supplied to the focussing driving coil 23 and the tracking driving coil 24 which are fixed to the holder 20.

In this embodiment, since two yokes are integrated with the base, the yoke position control is eliminated to reduce the number of steps in the manufacturing process. For the same reason, the number of the parts is decreased to eliminate the necessity of small tolerance of the parts which has been required in the conventional apparatus to obviate the summing of the dimensional errors of a number of parts. Consequently, the cost of the parts can be reduced remarkably. Furthermore, the construction of the objective lens driving apparatus is further simplified and, since the fixing of the yokes to the base by screws is unnecessary, the overall height of the objective lens driving apparatus is decreased by a certain amount, e.g., about 2 mm. Furthermore, the rigidity of the yokes is increased because they are integrated with the base, so that the noise attributable to the resonance of the yokes is suppressed to ensure a higher quality of the apparatus.

The bottom of the base can have a considerably complicated configuration provided that the yoke-base assembly is formed by sintering, so that guiding for securing the apparatus to another equipment, as well as other functional parts, can be formed on the bottom of the base without substantial difficulty.

Furthermore, the formation of the yoke and base by the sintered metal permits a less-expensive mass-production of the parts with high dimensional stability.

Although in the described embodiment the yoke has a substantially U-shaped form, this is not exclusive and the yoke can have a form constituted by a combination of cylinders, as in the case of the yokes which are used in speakers. The yoke-base assembly, which has been described as being a sintered body, may be formed by press work from a sheet metal.

INDUSTRIAL APPLICABILITY

As has been described, in the objective lens driving apparatus of the invention, the holder holding the objective lens is supported on the base through at least four lengths of metallic wire such that the deflection of these lengths of metallic wire allow the holder to move in two orthogonal directions. Consequently, the invention remarkably simplifies the construction of the objective lens driving apparatus and reduces the cost of the same, while suppressing occurrence of undesirable local resonance.

It is to be noted also that the torsional resonance can be prevented while reducing the electric power consumption and the heat generation, because the tracking driving coils can correctly face the magnets without requiring application of any biasing electric current. This in turn ensures superior transient characteristics when control is commenced, and completely eliminates the unstable operation which is attributable to torsional resonance.

In addition, by integrating the pair of yokes, it is possible to reduce the size of the objective lens driving apparatus and to ensure a high precision of operation of the apparatus, without necessitating any work for controlling the positions of the yokes.

What is claimed is:

[1. An objective lens driving apparatus for an optical disc player, comprising a base, a holder holding an objective lens, a supporting means for movably supporting said holder on said base, and a driving means for driving said holder both in a focussing direction corresponding to the optical axis of said objective lens and in a tracking direction substantially traverse to the focussing direction, said supporting means including at least four parallel linear members which are fixed at one of their ends to said base and at their other end to said holder, each said linear member being resilient in the focussing direction and in the tracking direction, so as to make said holder freely movable in the focussing direction and in the tracking direction, whereby all of said respective linear members themselves flex in the driving direction of said driving means to allow said holder to move when said holder is driven by said driving means in the focussing direction and in the tracking direction.]

2. An objective lens driving apparatus for an optical disc player [according to claim 1,] *comprising a base, a holder holding an objective lens, a supporting means for movably supporting said holder on said base, and a driving means for driving said holder both in a focussing direction corresponding to the optical axis of said objective lens and in a tracking direction substantially transverse to the focussing direction, said supporting means including at least four parallel linear members which are fixed at one of their ends to said base and at their other end to said holder, each said linear member being resilient in the focussing direction and in the tracking direction, so as to make said holder freely movable in the focussing direction and in the tracking direction, whereby all of said respective linear members themselves flex in the driving direction of said driving means to allow said holder to move when said holder is driven by said driving means in the focussing direction and in the tracking direction,* wherein said linear members comprise [elongated] metallic wire.

3. An objective lens driving apparatus for an optical disc player according to claim 2, *32 or 39,* wherein said metallic wire is one having high tensile strength.

4. An objective lens driving apparatus for an optical disc player according to claim [1] *32 or 39*, wherein said linear members are made of a polymeric material.

5. An objective lens driving apparatus for an optical disc player according to claim [1] *2, 32 or 39*, wherein a viscoelastic material is deposited onto [the] outer surfaces of said linear members.

6. An objective lens driving apparatus as in claim 3, wherein said metallic *wire comprises a* material *which* is selected from the group consisting of phosphor bronze wire, beryllium copper wire, piano wire and stainless steel wire.

[7. An objective lens driving apparatus for an optical disc player, comprising an objective lens; a holder holding said objective lens; a tracking driving coil and a focussing driving coil fixed to said holder; a base; magnets fixed to the said base and disposed to face said driving coils; and a flexible supporting means in the form of at least four linear members which are parallel to one another each of which is resilient in the focussing direction and in the tracking direction and having one end fixed to said holder and another end fixed to said base and supporting said holder movably with respect to said base; said supporting means applying a biasing force having a magnitude corresponding to the weights of said objective lens and said holder such that the centers of said driving coils correctly face the centers of said magnets when no electric current is supplied to said driving coils.]

8. An objective lens driving apparatus for an optical disc player [according to claim 7,] *comprising an objective lens; a holder holding said objective lens; a tracking driving coil and a focussing driving coil fixed to said holder; a base; magnets fixed to said base and disposed to face said tracking and focussing driving coils; and a flexible supporting means in a form of at least four linear members which are parallel to one another and each of which is resilient in a focussing direction and in a tracking direction and having one end fixed to said holder and another end fixed to said base and supporting said holder movably with respect to said base; said supporting means applying a biasing force having a magnitude corresponding to the weights of said objective lens and said holder such that the centers of said tracking and focussing driving coils correctly face centers of said magnets when no electric current is supplied to said tracking and focussing driving coils,* wherein said linear members comprise [elongated] metallic wire.

[9. An objective lens driving apparatus for an optical disc player according to claim 8, wherein said metallic wire is one having high tensile strength.]

[10. An objective lens driving apparatus as in claim 9, wherein said metallic material is selected from the group consisting of phosphor bronze wire, beryllium copper wire, piano wire and stainless steel wire.]

[11. An objective lens driving apparatus for an optical disc player according to claim 7, wherein said linear members are made of a polymeric material.]

[12. An objective lens driving apparatus for an optical disc player according to claim 7, wherein a viscoelastic material is deposited onto the outer surfaces of said linear members.]

[13. An objective lens driving apparatus for an optical disc player, comprising an objective lens; a holder holding said objective lens; a tracking driving coil and a focussing driving coil fixed to said holder; a base; a pair of magnets fixed to said base and disposed to face respective driving coils; a pair of yokes integrally formed of a magnetic material and disposed in the vicinity of said magnets; and a cantilever supporting means having one end fixed to said holder and another end fixed to said base and supporting said holder movably with respect to said base.]

[14. An objective lens driving apparatus for an optical disc player according to claim 13, wherein said pair of yokes and said base are constructed as a unit with each other.]

[15. An objective lens driving apparatus for an optical disc player comprising a base, a holder holding an objective lens, a supporting means for movably supporting said holder on said base, and a driving means for driving said holder both in the focussing direction and in the tracking direction, said supporting means comprising at least four parallel linear members which comprise a conductive metallic material and which are flexible in the focussing direction and in the tracking direction and are fixed at one of their ends to said base and at their other end to said holder, and said driving means comprises magnet means provided on said base and driving coils provided on said holder, so that said holder is driven in two orthogonal directions by the interaction between said magnet means and said driving coils, said driving coils being electrically connected at one of their ends to said metallic material such that said driving coils are supplied with electric current through said metallic material.]

[16. An objective lens driving apparatus for an optical disc player, comprising an objective lens; a holder holding said objective lens; a tracking driving coil and a focussing driving coil fixed to said holder; a base; magnet means fixed to said base and disposed to face said driving coils; and linear members comprising a conductive metallic material and having one end fixed to said holder and the other end fixed to said base and supporting said holder movably with respect to said base, said tracking and focussing driving coils being electrically connected at both of their ends to said metallic material so that said driving coils are supplied with electric current through said metallic material, said supporting means applying a biasing force having a magnitude corresponding to the weights of said objective lens and said holder such that the centers of said driving coils correctly face the centers of said magnets when no electric current is supplied to said driving coils.]

[17. An objective lens driving apparatus for an optical disc player according to claim 15, wherein said metallic material is one having high tensile strength.]

[18. An objective lens driving apparatus as in claim 17, wherein said metallic material is selected from the group consisting of phosphor bronze wire, beryllium copper wire, piano wire and stainless steel wire.]

[19. An objective lens driving apparatus for an optical disc player according to claim 15, wherein a viscoelastic material is deposited onto the outer surface of said supporting means.]

[20. An objective lens driving apparatus for an optical disc player according to claim 16, wherein said metallic material is one having high tensile strength.]

[21. An objective lens driving apparatus as in claim 20, wherein said metallic material is selected from the group consisting of phosphor bronze wire, beryllium copper wire, piano wire and stainless steel wire.]

[22. An objective lens driving apparatus for an optical disc player according to claim 16, wherein a viscoelastic material is deposited onto the outer surface of said supporting means.]

[23. An objective lens driving apparatus for an optical disc player, comprising a base, a holder holding an objective lens, a cantilever supporting means for movably supporting said holder on said base, and a driving means for driving said holder in a focussing direction and in the tracking direction, said supporting means comprising a conductive metallic material having one end fixed to said base and the other end fixed to said holder, and said driving means comprising magnets provided on said base and driving coils provided on said holder, so that said holder is driven in two orthogonal directions by the interaction between said magnets and said driving coils, said driving coils being electrically connected at their opposite ends to said supporting means constituted by said conductive metallic material such that said driving coils are supplied with electric current through said supporting means.]

[24. An objective lens driving apparatus for an optical disc player according to claim 23, wherein said magnets provided on said base are disposed to face said driving coils provided on said holder, and said supporting means applies a biasing force having a magnitude corresponding to the weights of said objective lens and said holder such that the centers of said driving coils correctly face the centers of said magnets when no electric current is supplied to said driving coils.]

[25. An objective lens driving apparatus for an optical disc player, comprising an objective lens, a holder holding said objective lens, a tracking driving coil and a focussing driving coil fixed to said holder, a base, magnets fixed to said base and disposed to face said respective driving coils, and a supporting means comprising four or more parallel linear members which are fixed at one of their ends to said base and at their other end to said holder, each of said linear members being resilient in the focussing direction and in the tracking direction.]

*26. An objective lens driving apparatus for an optical disc player, comprising an objective lens; a holder holding said objective lens; a tracking driving coil and a focussing driving coil fixed to said holder; a base; a pair of magnets fixed to said base and disposed to face respective ones of said tracking and focussing driving coils; a pair of yokes integrally formed of a magnetic material and disposed in a vicinity of said magnets; and supporting means including at least four parallel linear members each having one end fixed to said holder and another end fixed to said base and supporting said holder movably with respect to said base, wherein said linear members comprise metallic wire.*

*27. An objective lens driving apparatus for an optical disc player, comprising a base, a holder holding an objective lens, a supporting means for movably supporting said holder on said base, and a driving means for driving said holder both in a focussing direction and in a tracking direction, said supporting means comprising at least four parallel linear members each of which comprises a conductive metallic material and is flexible in the focussing direction and in the tracking direction and are fixed at one of their ends to said base and at their other end to said holder, and said driving means comprises magnet means provided on said base and driving coils provided on said holder, so that said holder is driven in two orthogonal directions by interaction between said magnet means and said driving coils, said driving coils being electrically connected at one of their ends to said metallic material such that said driving coils are supplied with electric current through said metallic material, wherein said linear members comprise metallic wire.*

*28. An objective lens driving apparatus for an optical disc player, comprising an objective lens; a holder holding said objective lens; a tracking driving coil and a focussing driving coil fixed to said holder; a base; magnet means fixed to said base and disposed to face said tracking and focussing driving coils; and linear members each comprising a conductive metallic material and having one end fixed to said holder and the other end fixed to said base and supporting said holder movably with respect to said base, said tracking and focussing driving coils being electrically connected at both of their ends to said metallic material so that said tracking and focussing driving coils are supplied with electric current through said metallic material, said supporting means applying a biasing force having a magnitude corresponding to the weights of said objective lens and said holder such that centers of said tracking and focussing driving coils correctly face centers of said magnets when no electric current is supplied to said tracking and focussing driving coils, wherein like linear members comprise metallic wire.*

*29. An objective lens driving apparatus for an optical disc player, comprising a base, a holder holding an objective lens, supporting means including at least four parallel linear members each for movably supporting said holder on said base, and a driving means for driving said holder in a focussing direction and in a tracking direction, said linear members of said supporting means each comprising a conductive metallic material having one end fixed to said base and the other end fixed to said holder, and said driving means comprising magnets provided on said base and driving coils provided on said holder, so that said holder is driven in two orthogonal directions by interaction between said magnets and said driving coils, said driving coils being electrically connected at their opposite ends to said linear members of said supporting means constituted by said conductive metallic material such that said driving coils are supplied with electric current through said supporting means, wherein said linear members comprise metallic wire.*

*30. An objective lens driving apparatus for an optical disc player, comprising an objective lens, a holder holding said objective lens, a tracking driving coil and a focussing driving coil fixed to said holder, a base, magnets fixed to said base and disposed to face said respective tracking and focussing driving coils, and a supporting means comprising four or more parallel linear members which are each fixed at one of their ends to said base and at their other end to said holder, each of said linear members being resilient in a focussing direction and in a tracking direction, wherein said linear members comprise metallic wire.*

*31. An objective lens driving apparatus for an optical disc player according to claim 2, 32 or 39, wherein said metallic wire is elongated.*

*32. An objective lens driving apparatus for an optical disc player, comprising a base, a holder holding an objective lens, a supporting means for movably supporting said holder on said base, and a driving means for driving said holder both in a focussing direction corresponding to the optical axis of said objective lens and in a tracking direction substantially transverse to the focussing direction, said supporting means including at least four parallel linear members which are each fixed at one of their ends to said base and at their other end to said holder, each said linear member being resilient in the focussing direction and in the tracking direction, so as to make said holder freely movably in the focussing direction and in the tracking direction, whereby all of said respective linear members themselves flex in the driving direction of said driving means to allow said holder to move when said holder is driven by said driving means in the focussing direction and in the tracking direction, wherein said at least four parallel linear members have a substantially uniform cross-sectional shape along an axis thereof.*

*33. An objective lens driving apparatus for an optical disc player, comprising an objective lens; a holder holding said objective lens; a tracking driving coil and a focussing driving coil fixed to said holder; a base; magnets fixed to said base and disposed to face said tracking and focussing driving coils; and a flexible supporting means in a form of*

*at least four linear members which are parallel to one another and each of which is resilient in a focussing direction and in a tracking direction and having one end fixed to said holder and another end fixed to said base and supporting said holder movably with respect to said base; said supporting means applying a biasing force having a magnitude corresponding to the weights of said objective lens and said holder such that the centers of said tracking and focussing driving coils correctly face centers of said magnets when no electric current is supplied to said tracking and focussing driving coils, wherein said at least four parallel linear members have a substantially uniform cross-sectional shape along an axis thereof.*

*34. An objective lens driving apparatus for an optical disc player, comprising an objective lens; a holder holding said objective lens; a tracking driving coil and a focussing driving coil fixed to said holder; a base; a pair of magnets fixed to said base and disposed to face respective ones of said tracking and focussing driving coils; a pair of yokes integrally formed of a magnetic material and disposed in a vicinity of said magnets; and supporting means including at least four parallel linear members each having one end fixed to said holder and another end fixed to said base and supporting said holder movably with respect to said base, wherein said at least four parallel linear members have a substantially uniform cross-sectional shape along an axis thereof.*

*35. An objective lens driving apparatus for an optical disc player, comprising a base, a holder holding an objective lens, a supporting means for movably supporting said holder on said base, and a driving means for driving said holder both in a focussing direction corresponding and in a tracking direction, said supporting means comprising at least four parallel linear members each of which comprise a conductive metallic material and is flexible in the focussing direction and in the tracking direction and are fixed at one of their ends to said base and at their other end to said holder, and said driving means comprises magnet means provided on said base and driving coils provided on said holder, so that said holder is driven in two orthogonal directions by interaction between said magnet means and said driving coils, said driving coils being electrically connected at one of their ends to said metallic material such that said driving coils are supplied with electric current through said metallic material, wherein said at least four parallel linear members have a substantially uniform cross-sectional shape along an axis thereof.*

*36. An objective lens driving apparatus for an optical disc player, comprising an objective lens; a holder holding said objective lens; a tracking driving coil and a focussing driving coil fixed to said holder; a base; magnet means fixed to said base and disposed to face said tracking and focussing driving coils; and linear members each comprising a conductive metallic material and having one end fixed to said holder and the other end fixed to said base and supporting said holder movably with respect to said base, said tracking and focussing driving coils being electrically connected at both of their ends to said metallic material so that said tracking and focussing driving coils are supplied with electric current through said metallic material, said supporting means applying a biasing force having a magnitude corresponding to the weights of said objective lens and said holder such that centers of said tracking and focussing driving coils correctly face centers of said magnets when no electric current is supplied to said tracking and focussing driving coils, wherein said linear members have a substantially uniform cross-sectional shape along an axis thereof.*

*37. An objective lens driving apparatus for an optical disc player, comprising a base, a holder holding an objective lens, supporting means including at least four parallel linear members each for movably supporting said holder on said base, and a driving means for driving said holder in a focussing direction and in a tracking direction, said linear members of said supporting means each comprising a conductive metallic material having one end fixed to said base and the other end fixed to said holder, and said driving means comprising magnets provided on said base and driving coils provided on said holder, so that said holder is driven in two orthogonal directions by interaction between said magnets and said driving coils, said driving coils being electrically connected at their opposite ends to said linear members of said supporting means constituted by said conductive metallic material such that said driving coils are supplied with electric current through said supporting means, wherein said at least four parallel linear members have a substantially uniform cross-sectional shape along an axis thereof.*

*38. An objective lens driving apparatus for an optical disc player, comprising an objective lens, a holder holding said objective lens, a tracking driving coil and a focussing driving coil fixed to said holder, a base, magnets fixed to said base and disposed to face said respective tracking and focussing driving coils, and a supporting means comprising four or more parallel linear members which are each fixed at one of their ends to said base and at their other end to said holder, each of said linear members being resilient in a focussing direction and in a tracking direction, wherein said four or more parallel linear members have a substantially uniform cross-sectional shape along an axis thereof.*

*39. An objective lens driving apparatus for an optical disk player, comprising a base, a holder holding an objective lens, a supporting means for movably supporting said holder on said base, and a driving means for driving said holder both in a focussing direction corresponding to the optical axis of said objective lens and in a tracking direction substantially transverse to the focussing direction, said supporting means including at least four parallel linear members which are each fixed at one of their ends to said base and at their other end to said holder, each said linear member being resilient in the focussing direction and in the tracking direction, so as to make said holder freely movably in the focussing direction and in the tracking direction, whereby all of said respective linear members themselves flex in the driving direction of said driving means to allow said holder to move when said holder is driven by said driving means in the focussing direction and in the tracking direction, wherein each of said linear members has no directivity in two orthogonal directions.*

*40. An objective lens driving apparatus for an optical disk player, comprising an objective lens; a holder holding said objective lens; a tracking driving coil and a focussing driving coil fixed to said holder; a base; magnets fixed to said base and disposed to face said tracking and focussing driving coils; and a flexible supporting means in a form of at least four linear members which are parallel to one another and each of which is resilient in a focussing direction and in a tracking direction and having one end fixed to said holder and another end fixed to said base and supporting said holder movably with respect to said base; said supporting means applying a biasing force having a magnitude corresponding to the weights of said objective lens and said holder such that the centers of said tracking and focussing driving coils correctly face centers of said magnets when no electric current is supplied to said tracking*

*and focussing driving coils, wherein each of said linear members has no directivity in two orthogonal directions.*

*41. An objective lens driving apparatus for an optical disk player, comprising an objective lens; a holder holding said objective lens; a tracking driving coil and a focussing driving coil fixed to said holder; a base; a pair of magnets fixed to said base and disposed to face respective ones of said tracking and focussing driving coils; a pair of yokes integrally formed of a magnetic material and disposed in a vicinity of said magnets; and supporting means including at least four parallel linear members each having one end fixed to said holder and another end fixed to said base and supporting said holder movably with respect to said base, wherein each of said linear members has no directivity in two orthogonal directions.*

*42. An objective lens driving apparatus for an optical disk player, comprising a base, a holder holding an objective lens, a supporting means for movably supporting said holder on said base, and a driving means for driving said holder both in a focussing direction and in a tracking direction, said supporting means comprising at least four parallel linear members each of which comprises a conductive metallic material and is flexible in the focussing direction and in the tracking direction and are fixed at one of their ends to said base and at their other to said holder, and said driving means comprises magnet means provided on said base and driving coils providing on said holder, so that said holder is driven in two orthogonal directions by interaction between said magnet means and said driving coils, said driving coils being electrically connected at one of their ends to said metallic material such that said driving coils are supplied with electric current through said metallic material, wherein each of said linear members has no directivity in two orthogonal directions.*

*43. An objective lens driving apparatus for an optical disc player, comprising an objective lens; a holder holding said objective lens; a tracking driving coil and a focussing driving coil fixed to said holder; a base; magnets means fixed to said base and disposed to face said tracking and focussing driving coils; and linear members each comprising a conductive metallic material and having one end fixed to said holder and the other end fixed to said base and supporting said holder movably with respect to said base, said tracking and focussing driving coils being electrically connected at both of their ends to said metallic material so that said tracking and focussing driving coils are supplied with electric current through said metallic material, said supporting means applying a biasing force having a magnitude corresponding to the weights of said objective lens and said holder such that centers of said tracking and focussing driving coils correctly face centers of said magnets when no electric current is supplied to said tracking and focussing driving coils, wherein each of said linear members has no directivity in two orthogonal directions.*

*44. An objective lens driving apparatus for an optical disk player, comprising a base, a holder holding an objective lens, supporting means including at least four parallel linear members each for movably supporting said holder on said base, and a driving means for driving said holder in a focussing direction and in a tracking direction, said linear members of said supporting means each comprising a conductive metallic material having one end fixed to said base and the other end fixed to said holder, and said driving means comprising magnets provided on said base and driving coils provided on said holder, so that said holder is driven in two orthogonal directions by interaction between said magnets and said driving coils, said driving coils being electrically connected at their opposite ends to said linear members of said supporting means constituted by said conductive metallic material such that said driving coils are supplied with electric current through said supporting means, wherein each of said linear members has no directivity in two orthogonal directions.*

*45. An objective lens driving apparatus for an optical disk player, comprising an objective lens, a holder holding said objective lens, a tracking driving coil and a focussing driving coil fixed to said holder, a base, magnets fixed to said base and disposed to face said respective tracking and focussing driving coils, and a supporting means comprising four or more parallel linear members which are each fixed at one of their ends to said base and at their other end to said holder, each of said linear members being resilient in a focussing direction and in a tracking direction, wherein each of said linear members has no directivity in two orthogonal directions.*

* * * * *